Dec. 12, 1950     H. R. LEGATSKI     2,533,945
CATALYST CHAMBER AND METHOD FOR HEATING SAME
Filed Aug. 2, 1948     2 Sheets-Sheet 1
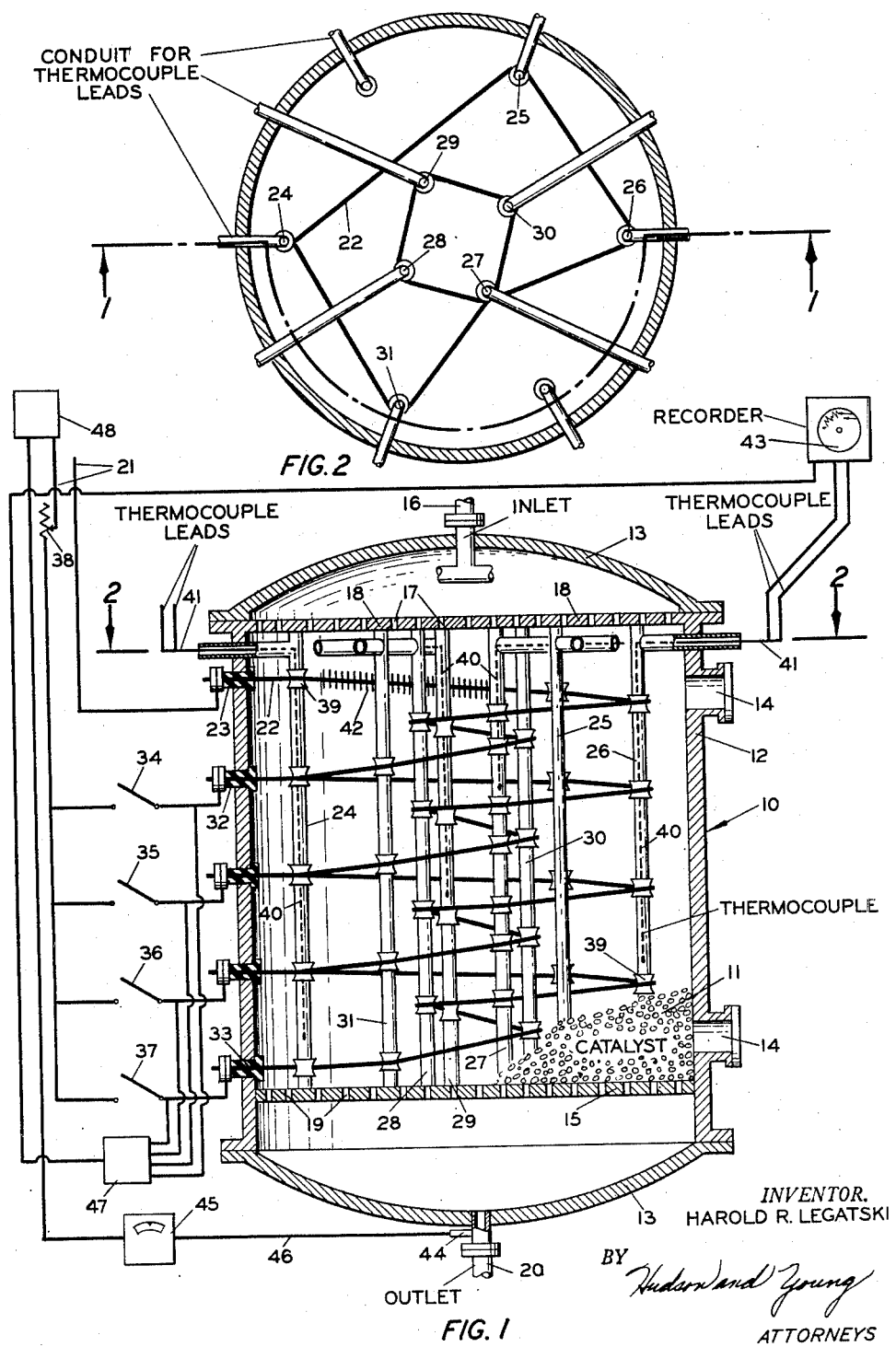
INVENTOR.
HAROLD R. LEGATSKI
BY Hudson and Young
ATTORNEYS

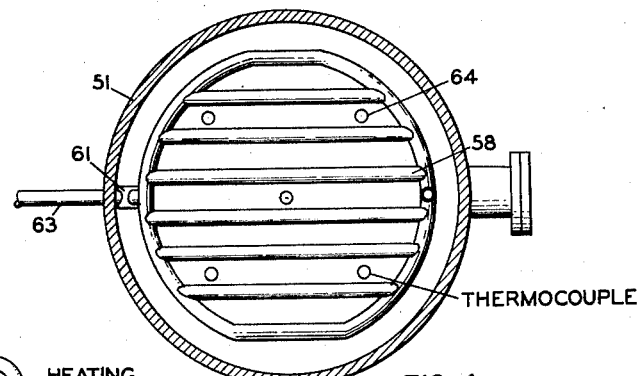
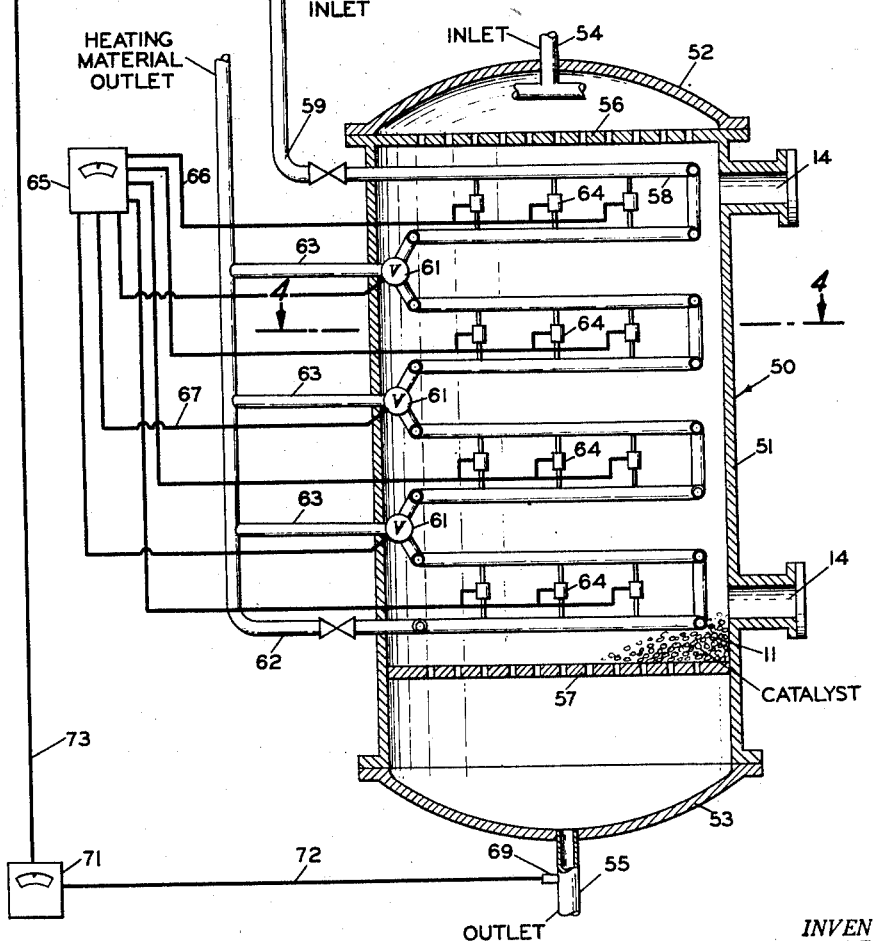

Patented Dec. 12, 1950

2,533,945

UNITED STATES PATENT OFFICE 2,533,945

CATALYST CHAMBER AND METHOD FOR HEATING SAME

Harold R. Legatski, Bartlesville, Okla., assignor to Phillips Petroleum Company, a corporation of Delaware Application August 2, 1948, Serial No. 42,043

14 Claims. (Cl. 196—52)

This invention relates to catalyst chambers. In one of its more specific aspects it relates to improved heating systems for catalyst chambers. In another of its more specific aspects it relates to a method for furnishing heat to catalyst chambers.

This application is a continuation-in-part of my United States application Serial No. 435,104, filed March 17, 1942, now Patent No. 2,463,115.

It is well known that many chemical reactions are endothermic in nature. Dehydrogenation reactions, for example, whether thermal or catalytic are endothermic and upon dehydrogenation or loss of hydrogen the reactants absorb heat from their surroundings. Thermal dehydrogenation obviously takes place in the presence of gases and as the reaction proceeds heat from the surrounding gases is absorbed and their temperature is lowered. In catalytic dehydrogenation reactions the temperature of the catalyst, as well as of the reacting gases, is lowered. Upon continued catalytic reaction in a dehydrogenation process, the catalyst is frequently cooled to a temperature below which it fails to promote the reaction to such an extent as to be economically impractical. That cooling of the catalyst takes place because of the rather great temperature coefficient of the dehydrogenation reaction. The same is true of other endothermic reactions. Because of this adverse heat effect, it is imperative that heat be added to the catalyst chamber in sufficient amounts to maintain a reasonable reaction rate.

Various methods of accomplishing heat additions to catalyst beds have been proposed and used but these methods have generally proved to be costly and difficult to carry out. For example, the use of tubes for carrying super-heated steam, hot flue gases or molten salts through the length of the catalyst bed has been suggested as well as the employment of a vapor recycle between a furnace and the catalyst chamber. Constant heating of the total length of the catalyst bed has the disadvantage that much of the activity of the catalyst is used up without any appreciable increase in the conversion rate.

One object of this invention is to provide an apparatus for furnishing heat to catalytic chambers. Another object of this invention is to provide an apparatus to furnish endothermic heat of dehydrogenation to dehydrogenation catalyst chambers, which apparatus is simple in construction and in operation. Another object of this invention is to provide an improved method for heating catalyst chambers during endothermic reactions therein. Another object of this invention is to provide an improved method for furnishing endothermic heat of dehydrogenation to dehydrogenation catalyst chambers. Other and further objects and advantages will be apparent to those skilled in the art upon careful study of the accompanying disclosure.

To achieve these objects and others, I have devised an electrical heating apparatus and a fluid heating apparatus which can be installed in and automatically or manually used in conjunction with a dehydrogenation catalyst chamber or other endothermic catalytic chamber in order to prevent temperature reductions of the catalyst due to the endothermic reactions taking place therein.

In the accompanying drawings which form a part of the specification, Figure 1 is a vertical section of a catalyst chamber embodying the preferred form of my invention. Figure 2 is a horizontal section taken on the line 2—2 of Figure 1. Figure 3 is a vertical section of a catalyst chamber embodying a modification of my invention. Figure 4 is a horizontal section taken along the line 4—4 of Figure 3.

Referring now to Figure 1 of the drawings, numeral 10 represents a catalyst chamber consisting of a shell 12 with end closures 13 attached thereto and containing catalyst material 11. The chamber is equipped with covered manholes 14 for charging or discharging catalyst and for inspection purposes. In the bottom of the chamber is a base plate 15 for supporting the catalyst load. The base plate is perforate so as to permit the free flow of gases through the catalyst. Reactant gases enter the inlet end of the chamber through reactant material inlet 16, pass through perforations 17 in support plate 18 through catalyst bed 11, out of the catalyst bed through perforations 19 in base plate 15 and out of the chamber through reaction vapor outlet 20.

The source of electrical power, not shown, furnishes electricity for heating the catalyst bed. The electric current enters the system through power lines 21 and electrical heating element 22 enters the catalyst chamber through shell 12 and is insulated from the chamber shell by insulator 23. Heating element 22 is wound around the element supports beginning at insulator 23 and extending about supports 24, 25, 26, 27, 28, 29, 30, 27, 31 and to support member 24, thereby completing one cycle or coil of the heating element. The end of this heating element is attached to electrical lead 32 which is positioned at the beginning of a second cycle or coil of the heating element. This heating coil is wound around the element support in exactly the same manner as was the first coil above described. Four heating coils are shown in Figure 1 of the drawings. I do not wish to define my invention by this specific number of coils since the number will be determined by such conditions as height of the catalyst chamber, the endothermic reaction taking place, the amount of heat necessary to produce the desired temperature, and such other conditions as size and resistance of the heating wire, the available voltage, etc. Electrical lead 33 connects the lower end of the heating element to the source of current.

The several electrical lead-ins are connected by switches 34, 35, 36, and 37 to the main circuit so that the length of the heating element within the catalyst chamber may be varied according to the variable phenomena of catalytic reaction therein. Voltage regulator 38 is inserted in the power line 21 so that the amount of heating may be controlled so as to maintain the catalyst and reactant materials at the desired temperature. Supports 24 to 31, inclusive, are equipped with spool type insulators 39 so as to prevent short circuiting of heating element 22. Figure 2 shows the plan view of these heating element supports carrying a heating coil element. While I have shown the heating element coil in the aforesaid manner, I do not wish to limit the arrangement of the vertical supports nor the form or extent of the heating element. The heating element may be arranged in a variety of patterns and yet serve the purpose of maintaining a predetermined temperature in the catalyst bed.

In order to control the temperature in the catalyst bed, it has been found advantageous to measure the temperature thereof. The temperature is preferably measured in a continuous manner as by automatic temperature and recording instruments. Accordingly, I have installed thermocouples 40 in as many of the vertical supports 24 to 31, inclusive, as necessary to give a reasonably true and accurate temperature measurement. Thermocouple lead wires 41 are attached to such recording instruments as recording potentiometer 43. The temperatures may be recorded on individual instruments or may be recorded on single instruments such as by "4-point" or "6-point," etc., recording instruments. This temperature recording instrument may then operate a control mechanism 47 so as to progressively close switches 34 to 37, inclusive, or an operator may control the voltage at 38 and manually operate switches 34 to 37 as he sees fit so as to maintain a predetermined temperature in the catalyst bed. In case the voltage and switches are manually operated, the operator may read and interpret recording potentiometer 43 to determine the proper adjustments. The electrical conductor or heating element 22 should be formed of material of high resistivity and resistance to oxidizing and reducing atmospheres at 1200° F. to 1400° F. encountered during catalytic operation and regeneration processes. I have found that an alloy containing approximately 18 per cent chromium and 8 per cent nickel serves very well under these varying conditions. In order to increase the efficiency of the heating element it may be advantageous to equip the heating element with fins 42 so as to increase the heat transfer surface of the heating element within the catalyst bed. The size of heating element 22 may be different for different dehydrogenation or other endothermic processes in which it may be used. The length and diameter of element 22 may best be determined for each application by the amount of heat required, the required distribution of heat through the catalyst bed, strength of the conductor, and the safe wattdensity limit. The heat transfer from the heating element to the reacting vapors and catalyst as mentioned above may be improved by use of projecting surfaces, such as fins 42 shown in Figure 1. Gravity measuring device 44 may be provided in effluent outlet conduit 20. Gravity of the effluent material is recorded on gravity recorder 45 which communicates with gravity measuring device 44 through line 46. Gravity recorder 45 may communicate with gravity regulator 48 through line 49.

The actual control instruments, mentioned herein, need not be fully described since such equipment is manufactured by recognized instrument and electrical manufacturers as standard equipment. Similarly the electrical connections from member to member, as shown diagrammatically, need not be illustrated in detail for these connections are also well standardized and are understood by the workmen of the "instrument department" of refineries and chemical plants.

In the operation of the device shown in Figure 1 of the drawing, reactant materials are inserted into the chamber through inlet conduit 16 and pass through perforations 17 in support 18 and pass through the catalyst bed and out of the chamber through perforations 19 in base plate 15 and out through effluent outlet conduit 20. Electric current is passed through lines 21 and into heating element 22. Switch member 34 is closed, thereby closing the electrical circuit and causing electrical current to flow through only a portion of heating element 22. In that manner only the upper portion of the catalyst bed is heated. Reactant materials are reacted in the upper portion of the catalyst bed which is heated by the charged portion of heating element 22. As the catalyst in the heated portion of the catalyst bed becomes more inactive the voltage may be increased so as to raise the temperature in that portion of the catalyst bed thus partially reviving the activity of the reaction. Temperature in the heated portion of the catalyst bed is measured by means of temperature measuring devices, such as thermocouples, in the heating element support members and the temperature is recorded on temperature recorder 43. When the temperature within the heated portion of the catalyst chamber has been raised to such a point that the catalyst within that portion of the chamber might be damaged, or if the rate of reaction of the reactant material, as determined by gravity measuring device 44, does not respond to the increase in temperature, switch 35 may be closed so as to extend the length of the heating element through which electrical current is passed to a next succeeding portion of the catalyst chamber. Inactivity of the catalyst in the heated portion of the catalyst chamber is quite often due to carbon lay-down on the catalyst. The carbon lay-down tends to short across the heating element, thus increasing the temperature within the heated portion of the catalyst bed. The length of the electrical heating element is therefore extended when the carbon lay-down becomes such that it causes the heating element to be shorted. In the manner above described, the volume of the catalyst bed through which the electrical current is passed and which is heated so as to produce reaction therein is progressively extended from the inlet to the outlet end of the catalyst chamber by successively closing switches 36 and 37 and successively opening switches 34, 35 and 36.

It will be observed that on closing switch 34, the relatively constant voltage across lines 21 passes in series through resistance 38 and heating element 22. As the dehydrogenation commences, the carbon, not shown, deposits on catalyst near the top of heating element 22 and reduces the resistance in the upper part of element 22. This lowering of resistance of series circuit 38, 22 increases the current in direct proportion. The heating effect or power P in watts is equal to the square of current I in amperes times the resistance R in ohms:

$$P = I^2 R$$

Therefore the shorting of carbon deposits increases the power in watts and overheats the catalyst 11. The overheating of the catalyst is indicated on recorder 43. The operator (or automatic control mechanism) moves the control 38 so as to increase the resistance in the circuit so that less current I flows in element 22 and the proper predetermined temperature mentioned above is thus maintained. When, however, the carbon deposits become too extensive for control of temperature by varying resistance 38, switch 35 will be closed so as to throw new resistance into the circuit. Resistance 38 is then adjusted to maintain the predetermined temperature.

In the device shown in Figure 3 of the drawing, catalyst chamber 50 comprises a substantially cylindrical shell 51 which is closed at its upper and lower ends by closure members 52 and 53, respectively. Reactant material inlet conduit 54 is provided in the upper end portion of chamber 50 and effluent outlet conduit 55 is provided in the lower end portion of the chamber. Chamber 50 is provided in its upper end with a perforate support plate 56 and in its lower end portion with a perforate base plate 57. Provided within chamber 50 between support plate 56 and base plate 57 is a plurality of conduit coils 58 which form heating material conduits through the catalyst chamber. The upper coil communicates with a heating material inlet conduit 59 in one of its sides and communicates with the next succeeding lower coil in another of its sides. The second and third coils from the top of the chamber are joined at their sides adjacent the point at which heating material inlet conduit 59 communicates with the upper coil. A two-way valve 61 is provided in the communicating conduit between the second and third coils. The remaining coils in the catalyst chamber are similarly connected at the first, second and third coils. Alternate coils are provided with two-way valves 61 in their communicating conduits and adjacent coils which are otherwise unconnected are connected by means of open conduits. Heating material outlet conduit 62 communicates between the bottom coil section and a heating material supply source. A plurality of heating material outlet conduits 63 communicate between the two-way valves 61 and heating material outlet conduit 62. Thermocouples 64 are provided within the catalyst chamber preferably between alternate pairs of coils. Any number of thermocouple members may be utilized so as to give a representative temperature record. Temperature recorder 65 is in communication with thermocouple member 64 through control lines 66. Control lines 67 extend between temperature recorder 65 and two-way valves 61. A composite recorder or individual recorders may be utilized as recorder 65. A pump 68 is provided in heating material inlet conduit 59. Specific gravity measuring device 69 is provided in effluent outlet conduit 55 and communicates with specific gravity recorder 71 through control line 72. Specific gravity recorder 71 communicates with pump 68 through control line 73. Catalyst material 11 may be inserted in the catalyst chamber 50 through manholes 14 so as to form the catalyst bed within chamber 50. This invention is not restricted to combinations of pairs of coils. Individual coils or a plurality of coils as a section may be utilized as a unit for heating the individual portions of the catalyst chamber.

In the operation of the device shown in Figure 3 of the drawing, reactant material is injected into chamber 50 through reactant material inlet conduit 54. The reactant materials pass through the perforations in support plate 56 downwardly through the catalyst bed in chamber 50, out through the perforations in base plate 57 and out of the chamber through effluent outlet conduit 55. Hot heating material, such as superheated steam, molten metal, and other hot liquids or gases which may be utilized as the heating material, is injected through line 59 and pump 68 into heating material conduits 58. It is desired to heat only the upper portion of a catalyst chamber during the initial operation of the endothermic process carried on therein. The two-way valve 61 between the second and third coils is closed so as to divert the flow of heating material from the second coil through the upper heating material outlet conduit 63 and thence back to a heating material supply source. Circulation of the heating material is continued through the upper two coils and specific gravity of the effluent material is measured in effluent outlet conduit 55 by gravity measuring device 69. The gravity of the effluent material is recorded by specific gravity recorder 71. As the specific gravity of the effluent material varies from a predetermined specific gravity, specific gravity recorder 71 communicates with pump 68 through control line 73 so as to vary the rate of pumping in accordance with the gravity change. If insufficient conversion is taking place within the conversion zone, recorder 71 causes pump 68 to increase its rate of pumping, thus supplying additional heat to the upper portion of the catalyst bed within chamber 50. The temperature within the upper portion of the catalyst bed is measured by temperature measurers, such as thermocouples 64, between the first and second coil and the temperature is recorded by a temperature recorder 65. As the temperature within that portion of the catalyst bed rises to an undesirable point, upper valve 61 is opened so as to allow heating material to pass into the third and fourth coils and the second valve 61 is closed so as to cause the heating material from the fourth coil to pass through the second heating material outlet conduit 63 to the heating material supply source. In that manner, as the catalyst within the first portion of the catalyst bed becomes relatively inactive, the volume of the catalyst bed through which heating material is passed is increased by adding the next succeeding portion of heating material conduit 58 to the flow circuit by adding the third and fourth coils to the system. As the temperature between the third and fourth coils, and first and second coils reaches a point which may be harmful to the catalyst material within that portion of the catalyst bed, additional sections of the heating material conduit are added to the heating system by opening successive valves 61. It will thus be seen that as carbon laydown on the catalyst progressively inactivates the catalyst material or as the catalyst material becomes progressively inactive from the inlet to the outlet end of the catalyst chamber, succeeding sections of the catalyst bed are brought into the operation of the endothermic reactions carried on within the chamber by supplying heat of conversion through the extension of the heating material conduits.

It will be obvious to those skilled in the art that various alterations and modifications in my heating apparatus may be made, as, for example, an increase in number of heating coil sections, variation in heating coil arrangement and in the number of control switches and valves, and a variation may be made in the inlet and outlet ends of the reaction chamber with a corresponding change in heating. All of these variations are within the intended scope of my invention. The control instruments mentioned in the description of the device shown in Figure 3 of the drawing need not be fully described since such equipment is manufactured by recognized instrument manufacturers and is conventionally used in the petroleum industry.

I claim:

1. A method for endothermic, catalytic conversion, which comprises the steps of introducing a material to be converted into a conversion zone charged with a catalyst material; passing heat of conversion into a first portion of said conversion zone; progressively extending to an additional portion of said conversion zone the volume into which heat is passed in series through said first conversion zone portion as the catalyst in the composite volume preceding each said additional portion of said conversion zone becomes relatively inactive; and removing conversion products from said conversion zone.

2. A method for endothermic, catalytic conversion, which comprises the steps of introducing a material to be converted into a conversion zone charged with a catalyst material; passing a hot heat exchange material into a first portion of said conversion zone in indirect heat exchange relation, whereby heat of conversion is supplied to said conversion zone portion; progressively extending to an additional portion of said conversion zone the volume into which said hot heat exchange material is passed in series flow through said first conversion zone portion as the catalyst in the composite volume preceding each said additional portion of said conversion zone becomes relatively inactive; and removing conversion products from said conversion zone.

3. A method for endothermic, catalytic conversion, which comprises the steps of introducing a material to be converted into a conversion zone charged with a catalyst material; passing heat of conversion into a first portion of said conversion zone; varying the heat input to said first conversion zone portion in accordance with the gravity of effluent material from said conversion zone; progressively extending to an additional portion of said conversion zone the volume into which heat is passed in series through said first conversion zone portion as the temperature in the preceding conversion zone reaches a predetermined temperature; alternately varying the heat input and extending the volume of conversion zone in accordance with the specific gravity of effluent and temperature of the heated conversion zone respectively; and removing conversion products from said conversion zone.

4. A method for endothermic, catalytic conversion, which comprises the steps of introducing a material to be converted into a conversion zone charged with a catalyst material having a substantially negligible electrical conductance; passing electrical energy through a portion of said conversion zone; converting to heat a substantial portion of said electrical energy so as to furnish heat of conversion to said portion of said conversion zone; progressively extending to an additional portion of said conversion zone the volume through which said electrical energy is passed as the catalyst in the composite volume next preceding each said additional portion of said conversion zone becomes electrically conductive by carbon laydown thereon; and removing conversion products from said conversion zone.

5. A method for catalytic dehydrogenation, which comprises the steps of introducing a material to be dehydrogenated into a dehydrogenation zone charged with an electrically substantially non-conductive dehydrogenation catalyst material; passing electrical energy through a portion of an uninsulated circuit traversing said dehydrogenation zone; converting to heat a substantial portion of said electrical energy so as to furnish heat of dehydrogenation to a portion of said dehydrogenation zone; progressively opening additional portions of said uninsulated circuit to said electrical energy as the catalyst in each next preceding portion of said dehydrogenation zone becomes electrically conductive by carbon laydown thereon and shorts the portion of uninsulated circuit traversing that portion of said dehydrogenation zone; converting to heat a substantial portion of said electrical energy in said added circuit portion so as to furnish heat of dehydrogenation to that portion of said dehydrogenation zone through which each additional opened portion of said circuit traverses; and removing dehydrogenation products from said dehyrdogenation zone.

6. A method for catalytic dehydrogenation, which comprises the steps of introducing a material to be dehydrogenated into a dehydrogenation zone charged with a dehydrogenation catalyst material; passing a hot heat exchange material through a first portion of a flow line by a circuitous route through a first portion of said dehydrogenation zone, whereby heat of dehydrogenation is supplied to said dehydrogenation zone portion; progressively and serially opening to said hot heat exchange material from said first portion of said flow line additional succeeding portions of said flow line in said dehydrogenation zone as said catalyst in each next preceding portion of said dehydrogenation zone becomes relatively inactive; whereby heat of dehydrogenation is supplied to each additional dehydrogenation zone portion; and removing dehydrogenation products from said dehydrogenation zone.

7. A method for catalytically converting endothermally, which comprises the steps of introducing a conversion material into a conversion zone charged with electrically substantially nonconductive catalyst material; passing electrical energy through a portion of an uninsulated circuit substantially uniformly traversing said conversion zone by means of a circuitous route; converting to heat a substantial portion of said electrical energy so as to furnish heat of conversion to a portion of said conversion zone; progressively opening additional portions of said uninsulated circuit to said electrical energy as the catalyst in each next preceding portion of said conversion zone becomes electrically conductive by carbon laydown thereon and shorts the portion of uninsulated circuit traversing that portion of said conversion zone; converting to heat a substantial portion of said electrical energy in each added circuit portion so as to furnish heat of conversion to that portion of said cnversion zone through which each additional opened portion of said circuit traverses; and removing conversion products from said conversion zone.

8. A method for catalytically converting hydrocarbons, which comprises passing reactant gases through an inlet in the top of a catalytic conversion chamber containing a bed of relatively electrically non-conducting catalyst material in contact with an electrical heating element extending generally from a point nearer said inlet about a plurality of hollow non-conducting supports to a point nearer an outlet in the bottom of said chamber; passing an electrical current through a first electrical connection leading to said heating element at said point nearer said inlet, through a portion of said electrical heating element and one of a plurality of switch means to one of a plurality of opposite poles so as to complete a circuit and provide heat of conversion to that portion of catalyst bed through which that portion of electrically charged heating element passes; varying the voltage by means of a controllable voltage power supply and varying said switch means as said catalyst becomes progressively electrically conducting by carbon laydown thereon and said heating element is progressively relatively shorted out, in accordance with changes of temperature within said chamber as indicated by thermocouples inside certain of said non-conducting supports, so as to maintain that portion of said chamber being heated at substantially a predetermined temperature; and removing effluent materials from said chamber through said outlet in the bottom of said chamber.

9. A method for endothermic, catalytic conversion, which comprises the steps of introducing a material to be converted into a conversion zone charged with a catalyst material; passing a hot heat exchange material into a first portion of said conversion zone in indirect heat exchange relation, whereby heat of conversion is supplied to said conversion zone portion; varying the volume of hot heat exchange material passed through said first portion of said conversion zone in accordance with gravity of the effluent material taken at the effluent outlet of said conversion zone; progressively extending to an additional portion of said conversion zone the volume into which said heat exchange material is passed in series flow, through said first conversion zone portion, as the temperature of said catalyst in the composite conversion zone volume next preceding each said additional portion of said conversion zone reaches a predetermined maximum; and removing conversion products from said conversion zone.

10. A catalytic converter comprising in combination a closed chamber having a reactant fluid inlet in one of its end portions and an effluent outlet in its other end portion, said chamber containing a solid catalyst material; an internally located heating fluid conduit extending over a tortuous course through said catalyst in said chamber, said conduit extending generally from a first point in the chamber wall near said reactant fluid inlet to a second point in the chamber wall near said effluent outlet; an externally located heating material supply conduit communicating with said fluid conduit at said first point; an externally located heating material outlet conduit communicating with said fluid conduit at said second point; a plurality of intermediate heating material outlet conduits extending through the chamber wall between said internally located fluid conduit at points intermediate its ends and said externally located heating material outlet conduit; valve means in the juncture between said intermediate heating material outlet conduits and said fluid conduit, whereby flow through the inlet end portion of said heating fluid conduit may be completed through the first intermediate heating material outlet conduit spaced from the inlet end of said chamber while closing the balance of said fluid conduit to flow or said first intermediate heating material outlet conduit may be closed to flow and the flow extended progressively to an additional portion of said fluid conduit; temperature recording means communicating with temperature measuring means within said chamber; specific gravity recording means communicating with specific gravity measuring means in said effluent outlet conduit; and pump means in said heating material conduit.

11. A catalytic converter comprising in combination a closed chamber having a reactant fluid inlet in one of its end portions and an effluent outlet in its other end portion, said chamber containing a solid catalyst material; a plurality of heating coils situated on different horizontal planes within said chamber; communicating conduits connecting adjacent coils in series; a heating material inlet conduit communicating through the chamber wall between an externally located heating material supply source and the first coil and spaced from said reactant fluid inlet conduit; a heating material feeder in said heating material inlet conduit; a first heating material outlet conduit extending through the chamber wall between an externally located heating material disposal point and the last coil section spaced from said reactant fluid inlet conduit; a valve in the communicating conduits communicating between adjacent said serially connected coils; intermediate heating material outlet conduits extending through the chamber wall between each said valve and said first heating material outlet conduit, whereby circulation of heating material may be restricted to the inlet end coil section or may be extended to include additional coil sections; at least one temperature measurer within each individual catalyst bed portion; at least one temperature recorder communicating with said temperature measurer; a specific gravity measurer in said effluent outlet; and a specific gravity recorder communicating with said specific gravity measurer.

12. The catalytic converter of claim 11, wherein a controller communicates between said specific gravity recorder and said heating material feeder, whereby the output of said feeder is controlled in accordance with the specific gravity of effluent from said converter.

13. The catalytic converter of claim 11, wherein a controller communicates between said temperature recorder and said valves, whereby said valves are operated in accordance with the temperature in the heated portion of said catalyst material and circulation of heating material is progressively extended to an additional adjacent portion of the catalyst bed formed by said catalyst material.

14. The catalytic converter of claim 11, wherein a first controller communicates between said specific gravity recorder and said heating material feeder, whereby the output of said feeder is controlled in accordance with the specific gravity of effluent from said converter; and a second controller communicates between said temperature recorder and said valves, whereby said valves are operated in accordance with the temperature in the heated portion of said catalyst material and circulation of heating material is progressively extended to an additional adjacent portion of the catalyst bed formed by said catalyst material.

HAROLD R. LEGATSKI.

REFERENCES CITED

The following references are of record in the file of this patent:

UNITED STATES PATENTS

| Number | Name | Date |
|---|---|---|
| 1,490,325 | Johnson | Apr. 15, 1924 |
| 1,721,523 | Midgley | July 23, 1929 |
| 1,782,824 | Hechenbleikner | Nov. 23, 1930 |
| 2,161,677 | Houdry | June 6, 1939 |
| 2,163,599 | Houdry | June 27, 1939 |
| 2,217,641 | Junkins | Oct. 8, 1940 |
| 2,458,433 | Simpson | Jan. 4, 1949 |
| 2,458,434 | Simpson | Jan. 4, 1949 |
| 2,458,435 | Simpson | Jan. 4, 1949 |